(12) United States Patent  
Lee (10) Patent No.: US 11,287,257 B2  
(45) Date of Patent: Mar. 29, 2022

(54) DEVICE AND METHOD FOR DETECTING TILT OF AN OBJECT

(71) Applicant: SIGNIFY HOLDING B.V., Eindhoven (NL)

(72) Inventor: Wei Pien Lee, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 267 days.

(21) Appl. No.: 16/623,416

(22) PCT Filed: Jun. 18, 2018

(86) PCT No.: PCT/EP2018/066044  
§ 371 (c)(1),  
(2) Date: Dec. 17, 2019

(87) PCT Pub. No.: WO2018/234204  
PCT Pub. Date: Dec. 27, 2018

(65) Prior Publication Data  
US 2020/0208971 A1 Jul. 2, 2020

(30) Foreign Application Priority Data

Jun. 22, 2017 (EP) .................................... 17177309

(51) Int. Cl.
| | |
|---|---|
| G01C 9/02 | (2006.01) |
| F21S 8/08 | (2006.01) |
| G01S 11/12 | (2006.01) |
| F21W 131/103 | (2006.01) |
| F21V 23/04 | (2006.01) |

(52) U.S. Cl.  
CPC ................ G01C 9/02 (2013.01); F21S 8/085 (2013.01); G01S 11/12 (2013.01); F21V 23/0464 (2013.01); F21V 23/0492 (2013.01); F21W 2131/103 (2013.01)

(58) Field of Classification Search  
CPC .. F21S 8/085; F21V 23/0442; F21V 23/0464; F21V 23/0492; H05B 47/11; G01C 9/02; G01S 11/12; F21W 2131/103  
USPC .......................................... 356/139.1, 139.01  
See application file for complete search history.

(56) References Cited

U.S. PATENT DOCUMENTS

| | | | |
|---|---|---|---|
| 5,026,998 A | 6/1991 | Holzl | |
| 5,513,000 A | 4/1996 | Smith et al. | |
| 5,838,432 A | 11/1998 | Tokuhashi et al. | |
| 2010/0029268 A1* | 2/2010 | Myer | F21S 9/043 |
| | | | 455/426.1 |
| 2012/0062123 A1* | 3/2012 | Jarrell | H05B 47/155 |
| | | | 315/131 |

(Continued)

FOREIGN PATENT DOCUMENTS

| | | |
|---|---|---|
| DE | 19913955 A1 | 11/1999 |
| WO | 2015104603 A2 | 7/2015 |

*Primary Examiner* — Jong-Suk (James) Lee  
*Assistant Examiner* — James M Endo (57) ABSTRACT

A tilt detection device uses externally generated electromagnetic signal sources to detect changes in relative orientational positioning of an object. A sensor (18) monitors intensity characteristics of electromagnetic stimuli received from remotely located sources, and a controller (16) utilises changes in those characteristics to inform detection and/or measurement of a state of tilting of an object to which the sensor is mounted.

15 Claims, 8 Drawing Sheets

(56) References Cited

U.S. PATENT DOCUMENTS

| | | | |
|---|---|---|---|
| 2013/0329439 A1* | 12/2013 | Hellkamp | A42B 3/044 362/464 |
| 2014/0320025 A1* | 10/2014 | Assoulin | H05B 47/115 315/154 |
| 2016/0081157 A1* | 3/2016 | Sepkhanov | H05B 47/11 315/153 |
| 2016/0113092 A1* | 4/2016 | Hartman | H02J 7/00 340/686.1 |
| 2016/0153831 A1* | 6/2016 | Weindorf | G01J 1/0266 250/239 |
| 2016/0286629 A1* | 9/2016 | Chen | F21V 5/045 |
| 2016/0323967 A1* | 11/2016 | Elwell | H05B 47/11 |
| 2016/0328960 A1* | 11/2016 | Broers | G08G 1/0116 |
| 2017/0011522 A1 | 1/2017 | Rajagopalan et al. | |
| 2017/0102234 A1* | 4/2017 | Oshetski | G01R 31/085 |

\* cited by examiner

DEVICE AND METHOD FOR DETECTING TILT OF AN OBJECT

CROSS-REFERENCE TO PRIOR APPLICATIONS

This application is the U.S. National Phase application under 35 U.S.C. § 371 of International Application No. PCT/EP2018/066044, filed on Jun. 18, 2018, which claims the benefit of European Patent Application No. 17177309.6, filed on Jun. 22, 2017. These applications are hereby incorporated by reference herein.

FIELD OF THE INVENTION

This invention relates to a device and method for detecting tilting of a body.

BACKGROUND OF THE INVENTION

Monitoring the condition of signage and lighting in cities is an important task for local authorities. One aspect of this task is identifying rapidly any pole-mounted lights or signs which have become bent, for instance to due collision by vehicles, or due to strong winds or angular drift as a result of improper installation. In the case of lighting in particular, a tilted pole can result in changes in how it illuminates its surroundings, which could lead to violation of prescribed norms and regulations. Furthermore, for any pole-mounted body, tilting can lead to or indicate instability of the pole, and so identifying occurrence quickly is important to avoid potential collapse of the pole, leading to accidents and injury.

Presently, identifying pole bending is only achievable through routine manual inspection of the entire relevant lighting and signage infrastructure in a town or city. This is time-consuming and inefficient, and leads to unnecessary delay in identifying tilted poles. Automated detection of tilting would therefore be of advantage.

One solution would be to install local inclination sensors to poles, such as accelerometers, enabling pole orientation to be derived from the sensed direction of gravitational pull. However, a major disadvantage of such an approach is that such sensors must be calibrated in situ before they can be reliably used. This is typically done by manually tilting the object through different degrees of tilting while the sensor is in a calibration mode. This is clearly not possible in the case of pole mounted infrastructure, where artificial tilt for purposes of calibration cannot be done.

Alternative means for detecting tilt of an object which does not require a physical calibration procedure is therefore required.

WO 2015/104603 A2 discloses methods and apparatus for commissioning of luminaires in a lighting network. In particular, topologic information is automatically generated by position sensitive detectors detecting ground footprints generated by each of the individual luminaires of the network. The detection results are subsequently combined to determine the relative positions of the position sensitive detectors and the luminaires.

U.S. Pat. No. 5,838,432 A discloses an optical angle detection apparatus including a light source section, a sensor section disposed separately from the light source section through a space, a timing controller, and a calculation processing section. The light source section includes a plurality of LEDs and a plurality of first polarizing plates whose polarizing directions differ from each other by 45 DEG in correspondence with the LEDs. The sensor section includes a lens and a two-dimensional position sensor. The timing controller sequentially and periodically turns on the plurality of LEDs. The calculation processing section calculates the angle of the light source section relative to the sensor section around an axis determined by the light source section and the inclination angles of the sensor section in two axial directions with respect to the optical axis of the light source section on the basis of an output from the two-dimensional position sensor which changes in accordance with the amount of light incident from the light source section onto the sensor section and the coordinates of an incident spot.

SUMMARY OF THE INVENTION

The invention is defined by the claims.

According to examples disclosed herein, there is provided a device for detecting tilting of an object, the device comprising: a sensor for sensing electromagnetic wave stimuli, the sensor for mounting to the object and arranged in use to receive an electromagnetic wave stimulus from one or more remotely located stimulus sources; and a controller, adapted to: detect changes in one or more intensity characteristics of the received stimulus compared with a reference stimulus, the changes being indicative of changes in a positional relationship between the one or more stimulus sources and the sensor, and determine, based on said detected changes in the one or more intensity characteristics and/or the indicated changes in the positional relationship, a state of tilting of the object.

In examples an electromagnetic wave stimulus from a plurality of remotely located stimulus sources is received to detect a state of tilt of the object. As will be explained further, a state of tilting of the object may be detected with improved accuracy and reliability when one or more intensity characteristics of an electromagnetic wave stimulus from a plurality of remotely located stimulus sources is compared with a reference stimulus. For example very small but correlated changes in one or more intensity characteristics of the electromagnetic wave stimulus received from a plurality of stimulus sources may already indicate, with a higher degree of reliability and accuracy, a tilting state of the object.

The teaching is based on detecting tilt by detecting changes in characteristics in received electromagnetic (e.g. optical) signals originating from external sources having a relatively stable position or pattern of positions over time. If there is no tilt in the object, characteristics of the received stimuli or signals (either statically or as a function of time over some time period) should stay consistent at least from one period to the next. Any changes in the detected characteristics of the signal are an indication that a change in the relative positioning between the sensor and the stimulus sources has occurred, thereby indicating tilt.

The intensity characteristics of the received stimulus may include for instance a static intensity distribution of the received stimulus, or may include a pattern of intensity variation of the stimulus over some defined time period. Hence these may be instantaneous intensity characteristics or dynamic intensity characteristics.

The changes in positional relationship may be changes in a fixed or static positional relationship or changes in a dynamic positional relationship (in the case of moving sources which move in a regular and predicable way).

Where the stimulus source is an optical (e.g. visible light) source, a light modulation element may in accordance with some examples be provided to pattern or shape the stimulus so as to make it easier to identify changes in relative positioning between the external stimulus sources and the sensor. In particular, the light modulation element may be arranged to interact with light entering the sensor so as to provide a light modulation pattern onto the sensor, wherein a configuration of the pattern is dependent upon the angle of the incoming light.

For instance, the light modulation element may include a boundary wall extending around a perimeter of the sensor. The wall in this case impedes at least a portion of the light entering the sensor when the light source is at certain angles relative to the sensor, casting a shadow of a particular shape on the sensor. By monitoring changes in total light intensity incident at the sensor either statically or as a function of time, changes in the relative positioning of the sensor can be detected, and therefore tilt.

In some examples, the light modulation element may comprise a mask extending over the sensor, and wherein the light modulation element comprises, for one or more sets of angles, one or more localised areas of relative high light intensity surrounded by an encompassing region of shadow.

The intensity characteristics may be characteristics of a spatial intensity distribution received across a one or two dimensional sensory input surface or field of view of a sensor. The intensity characteristics may include a total intensity or flux received by the sensor.

The reference stimulus input may advantageously be an input representative of that received by the sensor when the object to which it is to be coupled is in a known state of tilt, for instance substantially upright (or vertical) with respect to the ground.

The device is configured to determine a state of tilting of the object to which it is mounted. By state of tilting may be meant an angle or degree of tilt relative for instance to a base of the object or relative to the ground or other object or body to which the object is mounted. State of tilting may be non-quantitative and comprise simply a detection of whether the object is tilted or not tilted.

The external electromagnetic wave stimulus sources can be static sources, or moving sources, in either case having some stable positional relationship with respect at least to fixed points on earth.

Examples of moving sources which might conveniently be used include the sun and/or the moon, both of which (typically) exhibit apparent movement with respect to fixed points on the earth, but in accordance with a highly regular and predictable pattern or trajectory, thereby exhibiting a stable dynamic positional relationship with those fixed points. More complex examples may include for instance car headlights travelling along a road with known trajectory. Due to the fixed directionality of the road, the pattern of movement of the headlights relative to a fixed point remains stable. More details of this example will be given below.

Examples of static sources which might conveniently be used include locally positioned external light sources such as nearby street lights or signage lights. The device may for instance be used to monitor tilt of a pole light. In this case, fixed external stimulus sources may include neighbouring pole lights. Sets of neighbouring light poles may each be provided tilt detection devices and utilize the light sources of their neighbours as fixed stimulus sources. In this case, the sets of neighbouring light sources may optionally be (directly or indirectly) communicatively linked via a communicated network to enable sharing of data outputs. This may enable 'auto-calibration' between the neighbouring devices, so that it can be determined, by correlating outputs of the different devices which of them is tilting and which is merely detecting tilt of a neighbouring device.

In accordance with any embodiment, but in particular in accordance with examples in which static electromagnetic wave stimulus sources are utilised, the sensor may be provided having a field of view, and wherein the one or more intensity characteristics include locations in the field of view of one or more intensity maxima associated with one or more respective stimulus sources, and the tilting being detected by detecting changes in said locations compared to a set of reference locations. Changes in the perceived positions of the maxima may indicate changes in relative positioning between the sensor and the external sources, thereby indicating tilting. Preferably the characteristics include locations in the field of view of at least two intensity maxima associated with a respective at least two stimulus sources, although the disclosure is not limited to such an example.

Additionally or alternatively, other curve comparison techniques may be applied to identify changes in intensity characteristics of a received one or more stimuli from static sources. These may include detecting a phase shift in the intensity distribution received across a sensor field of view from one or more sources. Such a phase shift may indicate movement of the stimulus source. Changes in an intensity gradient of a received stimulus across the field of view may also be detected, and used to provide an indication of movement of the stimulus source(s).

The sensor may in accordance with one or more examples have a field of view, and wherein the one or more intensity characteristics include a detected total number of intensity maxima within said field of view. Disappearance of an intensity maximum from the field of view which was present previously may be an indication of shift in the field of view, and therefore an indication of tilting of the object.

In accordance with the above, or any other examples, signal outputs from the sensor may be further processed in advance of detecting changes in received intensity characteristics so as to improve quality of the signal or reduce signal noise. Any known methods for achieving this may be applied, including for instance, filtering, averaging over multiple consecutive 'frames' or demodulating raw signals to extract envelope data.

As discussed, the one or more stimulus sources may have a dynamic positional relationship with respect to the sensor. In these cases, the one or more intensity characteristics may include a variation in measured electromagnetic intensity at the sensor as a function of time over some defined time period, defining a function of intensity over said defined time period, where the tilting is detected by detecting changes in said function of intensity over the defined time period compared to a reference function of intensity over the defined time period. An example might be the sun which follows a known trajectory relative to a fixed body on earth. This trajectory throughout the period of daylight hours leads to a predictable pattern or distribution in the received light intensity at the sensor as a function of time over those hours. A change in the measured intensity-time function across daylight hours may provide an indication of a change in angular positioning of the sensor and hence tilt of the body to which it is mounted.

In examples, the change in the function of intensity over time may include a translation of the function in the time dimension. By this is meant that the overall pattern or shape of the intensity-time function may remain the same, but is simply shifted forwards or backwards (i.e. offset) by a certain amount of time. This may occur in particular where the sensor comprises a perimeter wall as described above, and when the sensor is rotated in the same direction as the apparent movement of the stimulus source during the defined time period.

In further examples, the change in the function may include simply a translation of a location of a peak intensity of the function in the time dimension.

In accordance with one or more examples, the change in the function of intensity over time may comprise a change in a peak intensity of the function. By peak intensity is meant the highest level that the measured intensity reaches across the defined period of time (e.g. the hours of daylight). This change in peak intensity may occur in particular where the sensor comprises a perimeter wall as described above, and when the sensor is rotated in the direction perpendicular to the apparent direction of movement of the stimulus source during the defined time period.

In accordance with one or more examples, the change in the function of intensity over time may include an increase in a width of the intensity function in the time dimension, between a start point of minimum intensity and a later end point of the same minimum intensity. Advantageously in these examples, the sensor may comprise a perimeter wall having a non-circularly symmetric outer shape or cross-section. In this case, change in the width (in the time dimension) of the intensity-time function may indicate axial rotation of the object to which the sensor is mounted. As the sensor axially rotates, the asymmetry of the perimeter wall leads to a different minimum angle which the moving source must overcome before any light enters the sensor directly. This leads to changes in the total width or duration of the intensity-time function between end points of minimum intensity.

As noted above, the one or more (moving) stimulus sources may include the sun and/or the moon.

In accordance with one or more sets of embodiments, the sensor may comprise one or more photodiodes (for detecting optical stimuli). An array of photodiodes may be provided to provide a one or two dimensional field of view of the sensor.

In accordance with one or more sets of embodiments, the sensor may comprise a camera, the camera having a field of view. The camera in accordance with one or more embodiments may comprise a fish-eye lens for capturing a relatively wide field of view.

As noted above, where the sensor is an optical sensor, the sensor may comprise a light modulation element arranged to interact with light entering the sensor so as to provide a light modulation pattern onto the sensor, wherein a configuration of the pattern is dependent upon the angle of the incoming light.

In accordance with one or more particular examples, the light modulation element may be adapted to attenuate light entering the sensor in accordance with a defined attenuation pattern. The light modulation element may for instance comprise a translucent or otherwise partially transparent optical element to attenuate light with a particular pattern. Rather than regions of shadow being cast on the sensor, instead, regions simply of lower light intensity are cast. This may enable greater nuance in the tilt detection functionality, with small changes in tilt for instance leading to commensurately small changes in attenuation, thereby allowing for more precise measurement.

Examples in accordance with a further aspect discloses herein provide a connected system of multiple tilt detection devices. In particular, there may be provided a tilt detection system comprising: a plurality of devices in accordance with any of the examples or embodiments described in this disclosure for detecting tilt of an object, the devices being directly or indirectly linked via a communication network, and wherein each device is adapted to communicate via said communication network one or more data outputs derived from a respective sensor.

Such a system enables collected sensor data to be shared or combined to increase analysis accuracy and robustness. In particular, such a system provides the possibility of 'auto-calibration' functionality, wherein data from one or more devices maybe used as a reference against which readings from another device (located proximal to the first one or more) may be calibrated. In particular, at least a first of the plurality of connected devices may be adapted to utilize one or more of the data outputs communicated by a second of the plurality of devices as a reference stimulus for detecting changes in a stimulus received at the sensor of the first.

In examples, this may require knowledge of the relative positional relationship between the devices in question, such that this geometric information may be used to register one dataset to the other, and discount positional variations.

This may be particularly useful for instance in the case of using vehicle headlights travelling along a nearby road as a moving light source. In this case, comparison of intensity vs time readings at multiple different sensors at known different positions adjacent the road may enable anomalous readings at one sensor, caused by tilting, to be identified. The devices may be arranged such that their sensors have overlapping fields of view. This may allow correlation of signals/data and can be even more accurate when combined with positional data relating to each sensor, derived for instance from associated GPS sensors.

Examples in accordance with a further aspect disclosed herein provide a base-mountable pole comprising a tilt detection device in accordance with any embodiment or example described above or defined in the claims of the application, the device mounted to the pole and adapted to detect tilt of the pole, and optionally wherein the pole further comprises a luminaire, thereby forming in combination with the pole a pole lamp.

Examples in accordance with a further aspect disclosed herein provide a method of detecting tilting of an object, the method comprising: receiving at a sensor for sensing electromagnetic wave stimuli a stimulus from one or more remotely located stimulus sources, the sensor being mounted to the object; detecting changes of one or more intensity characteristics of the received stimulus compared with a reference stimulus, the changes being indicative of changes in a positional relationship between the one or more stimulus sources and the sensor, and based on said detected changes in the one or more intensity characteristics and/or the indicated changes in the positional relationship, determining a state of tilting of the object.

BRIEF DESCRIPTION OF THE DRAWINGS

Examples of the invention will now be described in detail with reference to the accompanying drawings, in which.

DETAILED DESCRIPTION OF THE EMBODIMENTS

Disclosed herein is a tilt detection device which uses externally generated electromagnetic signal sources to detect changes in relative orientational positioning of an object. A sensor monitors intensity characteristics of electromagnetic wave stimuli received from remotely located sources, and a controller utilises changes in those characteristics to inform detection and/or measurement of a state of tilting of an object to which the sensor is mounted.

Figure 1:
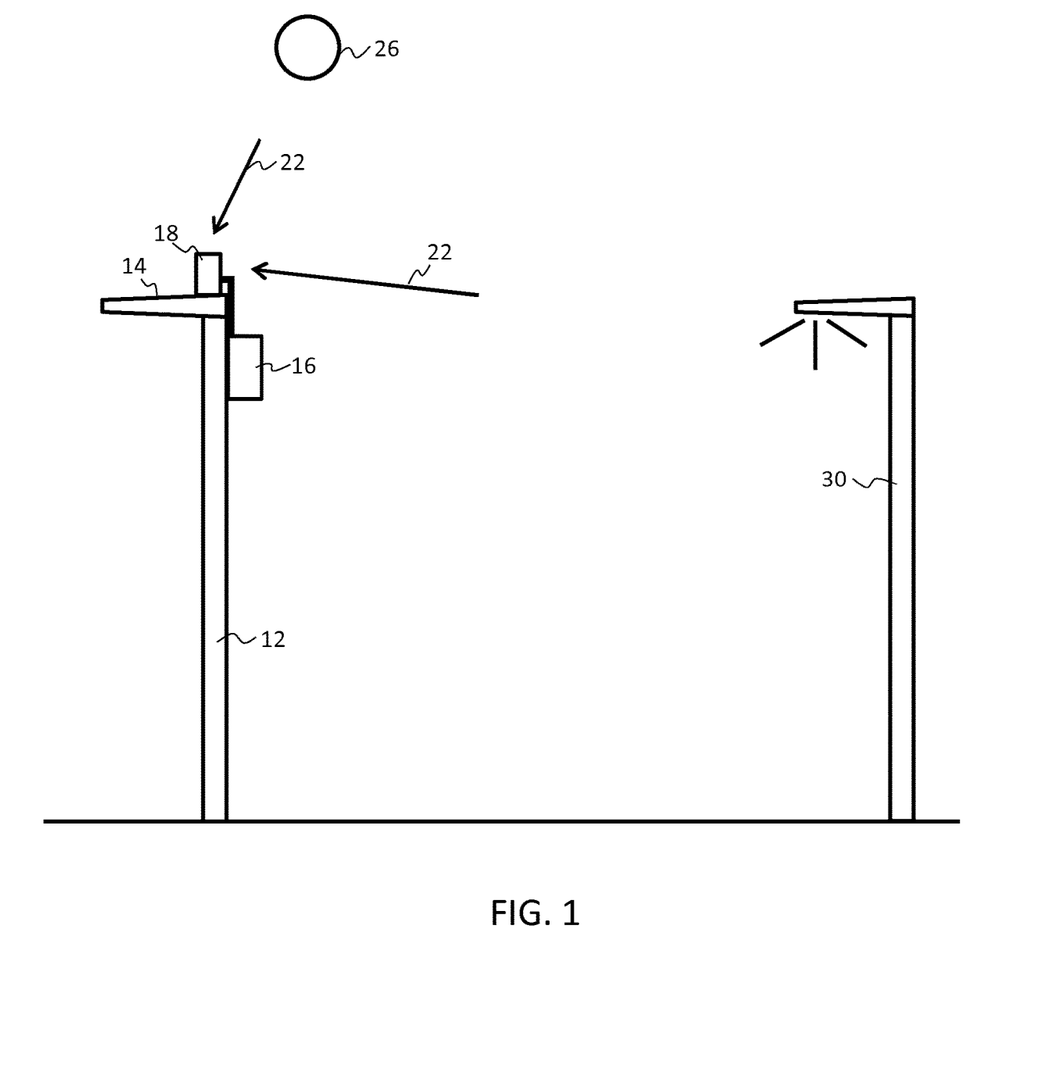
FIG. 1 schematically depicts a luminaire comprising a tilt detection device in accordance with one or more embodiments.

The general concept is schematically illustrated in FIG. 1. A tilt detection device is provided comprising of the combination of a controller 16 and an optical sensor 18 operatively coupled to the controller. The device is mounted to a pole lamp type luminaire 12 (pole-lamp street light), comprising a light source 14 at the top of a pole. The optical sensor 18 of the tilt detection device is preferably mounted above the level of the light source 14 so as to avoid the local illumination of the luminaire interfering with the tilt detection of the device.

Although an optical sensor 18 is provided in the particular example of FIG. 1, in further examples, a sensor for sensing any other kind of electromagnetic wave may be provided, such as by way of non-limiting example, an infrared sensor or an ultraviolet light sensor. Furthermore, although the sensor 18 is mounted above the light source 14 in the present example, this is not essential. Collimating or filtering elements may instead be provided for instance to prevent locally generated light from entering the sensor or from otherwise interfering in tilt detection. Alternatively, the tilt detection function may be run only during daylight hours, or when the local luminaire is otherwise temporarily deactivated, thereby avoiding interference. For the avoidance of doubt, the particular positioning of the controller 16 is not important to the working of the inventive concept and its position in the example of FIG. 1 is illustrative only.

The sensor 18 is arranged to receive one or more optical inputs from one or more remotely located luminous sources. In the example of FIG. 1, two possible luminous input sources and respective luminous inputs 22 are shown, a neighbouring luminaire 30 and the sun 26. Although two possible sources are shown in FIG. 1, this is for illustration only. In use, the sensor may typically be adapted to receive and utilise only one of these two types of sources—moving or static—or at least would only make use of one type at any one time.

In the normal, upright position of the luminaire 12 of FIG. 1, the luminous input received from either of the sources is sensed by the sensor 18, and intensity characteristics of the received input (either static or time-varying) are identified by the controller 16. While the luminaire remains in the same static position, its relative positional relationship with each of the sources (be this static, in the case of neighbouring luminaire 30, or dynamic in the case of the sun 26) remains constant. However, should the pole become tilted, for instance due to collision with a motor vehicle, the relative positional relationship changes. As this relationship changes, so the intensity characteristics of the received luminous input commensurately change. By monitoring for changes in the characteristics of the luminous input therefore, the controller 16 may identify changes in a tilt state of the luminaire 12.

Operation of the tilt detection device will now be described in detail with reference to a number of particular embodiments.

As discussed above, the external stimulus sources may be static sources (relative to the ground), or moving sources (relative to the ground).

Embodiments of a tilt detection device adapted to utilise static stimulus sources will now be described, with reference to FIGS. 2 and 3.

Figure 2:
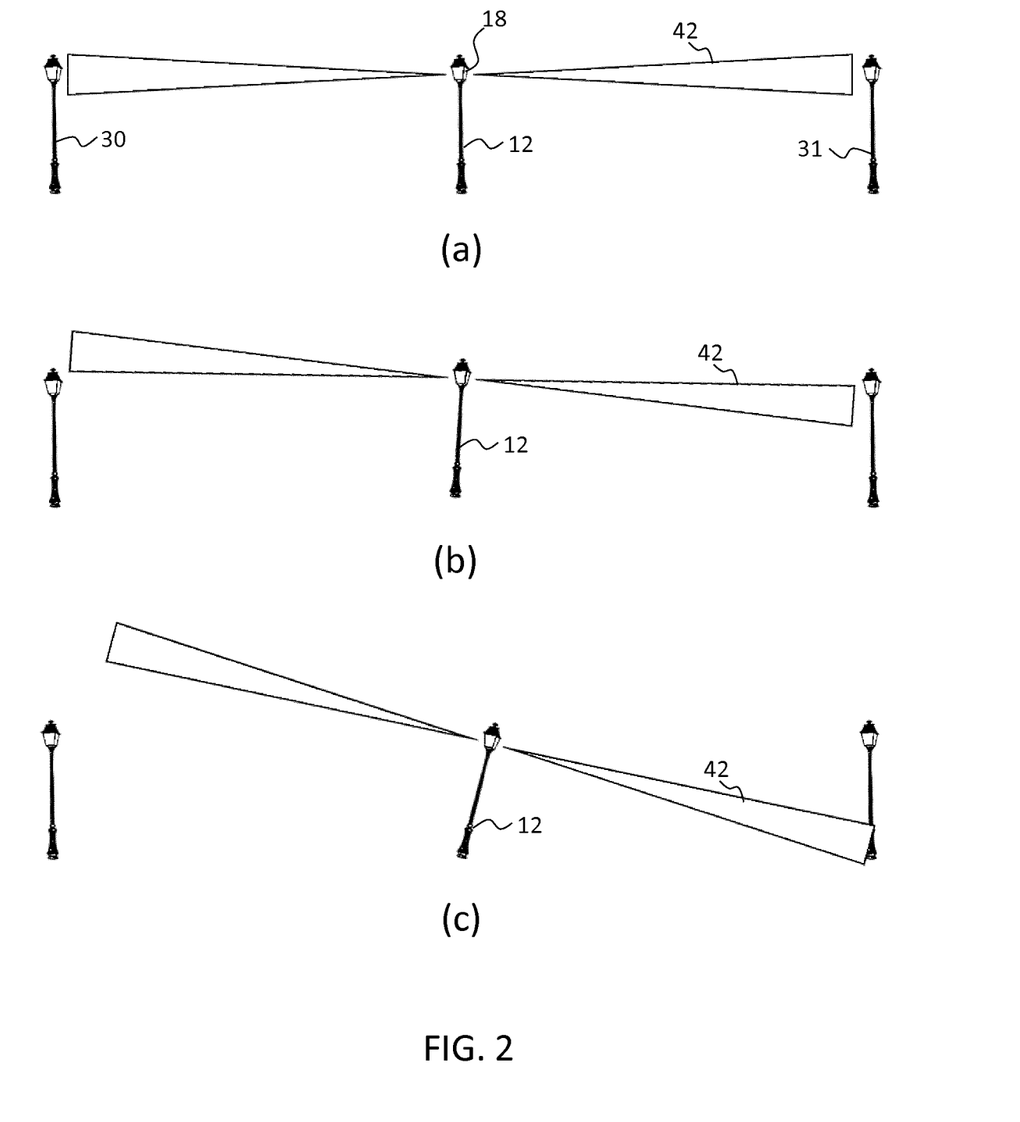
FIG. 2 schematically illustrates functional operation of a tilt detection device in accordance with one or more embodiments.

FIG. 2 shows an example luminaire 12 having an optical sensor 18 of a tilt detection device mounted near to the top of the pole, the optical sensor having a field of view 42 which is wide enough to encompass light sources of two neighbouring luminaires 30, 31. The optical sensor may advantageously be a camera having a fish-eye lens to enable capturing of a field of view wide enough to encompass the two neighbouring light sources 30, 31.

For the present example, the light sources of the neighbouring luminaires 30, 31 are assumed to be at the same elevation (height from the ground) as the light source of the luminaire 12 in question (and approximately the same as the optical sensor 18). Assuming that the positioning of the neighbouring light sources remains static, if the luminaire is in an upright position, as shown in FIG. 2(a), the two neighbouring light sources remain visible to the sensor 18, aligned approximately along a central line of the field of view 42 of the sensor 18, located at opposite ends of the field of view.

Figure 3:
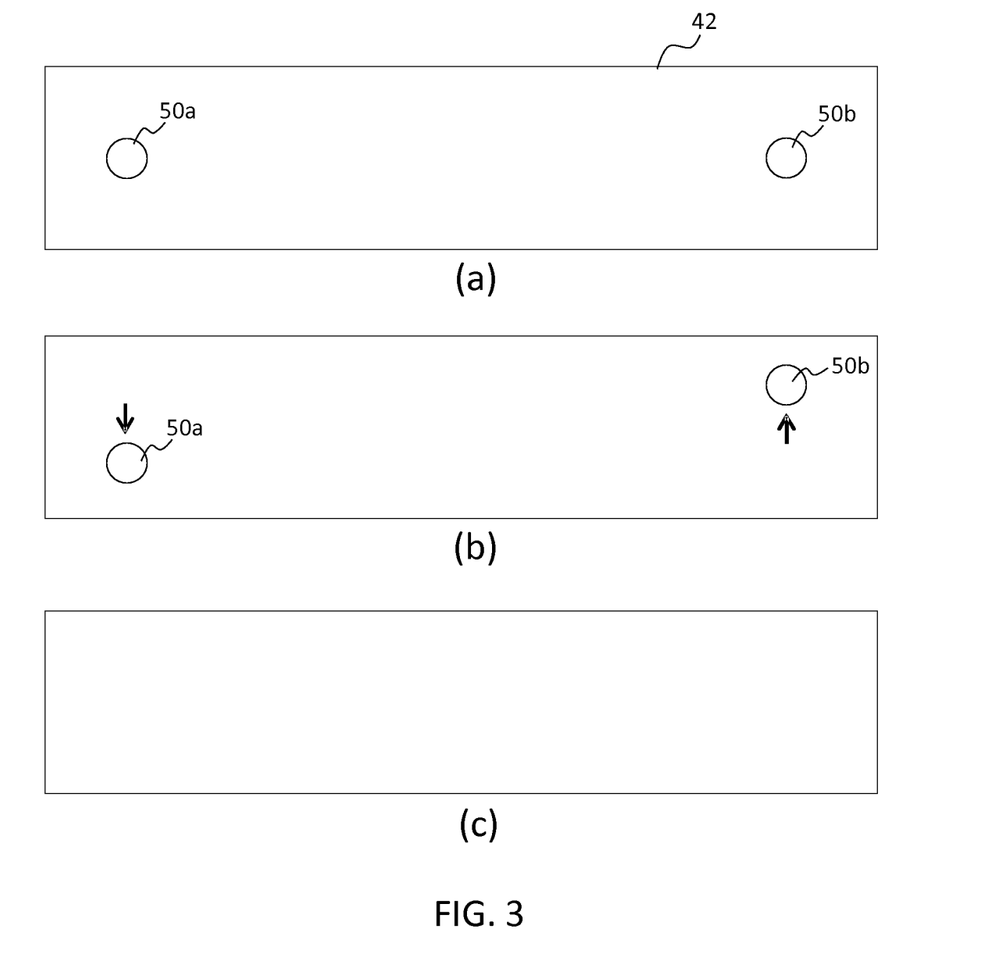
FIG. 3 further schematically illustrates operation of the tilt detection device of FIG. 2.

This is illustrated in FIG. 3(a), which illustrates the intensity distribution observable across the field of view 42 according to the upright arrangement of FIG. 2(a). The observable intensity distribution comprises two intensity maxima 50a, 50b located approximately centrally, at opposite ends of the field of view.

Should the luminaire 12 become tilted by a relatively small amount, the field of view 42 of the optical sensor 18 becomes commensurately tilted, as shown in FIG. 2(b). The effect upon the intensity distribution visible within the field of view is shown in FIG. 3(b), wherein the intensity maxima 50a, 50b associated with each of the two neighbouring light sources 30, 31 become 'vertically' displaced by a small amount, with the maximum 50a associated with the left hand luminaire 30 shifting downwards, and the maximum 50b associated with the right hand luminaire 30 shifting upward. Hence, the tilting of the luminaire 12 may be detected by the controller 16 of the tilt detection device by identifying that the intensity maxima located in the field of view of the sensor 18 have moved position relative to the set of reference positions represented by the 'upright' field of view of FIG. 3(a).

A quantitative assessment of the degree of tilt could be derived by determining quantitatively a distance that each of the intensity maxima 50a, 50b move within the field of view 42 of the sensor 18. Calibration between angle of tilt and distance of maxima shift could be achieved by prior calculation or modelling using standard geometric and trigonometric considerations. Alternatively this could be derived experimentally e.g. during commissioning by use of an additional, temporary or transient calibration device which can be approximately collocated with each luminaire and manipulated to tilt along a similar axis as the luminaire. The changes in sensed maxima position versus tilt angle could be recorded and used in future for the given luminaire to quantify a degree of tilt based on detected changes in the intensity maxima positions.

In the case that the luminaire 12 becomes even further tilted, as shown in FIG. 2(c), the field of view 42 of view of the sensor 18 may become so far displaced that the light sources of neighbouring luminaires 30, 31 are no longer visible within the field of view. This is illustrated in FIG. 3(c) which schematically depicts the intensity distribution observable across the field of view for the situation of FIG. 2(c). In this case, the controller 16 of the tilt detection device may detect pronounced tilt of the device (beyond the tilt level of FIG. 2(b)) by identifying a reduction, by two, of the total number of intensity maxima visible within the field of view 42 of the optical sensor.

By using a combination of detecting movement of intensity maxima 50a, 50b within the field of view 42 and detecting disappearance of intensity maxima from the field of view, tilt of an object can thus be detected using static luminous sources.

Although, for simplicity, in the above example, an assumption was included that the light sources of the neighbouring luminaires 30, 31 are at the same elevation (height from the ground) as the optical sensor 18, such an assumption is not essential. In further examples, information about the relative heights of each of the luminaires and sensors may be included in determinations as to a degree of tilt of any luminaire. This height information may be determined in advanced and pre-stored at each controller 16 for example. Additionally or alternatively, the information may be determined using positional sensor data (where this includes elevation information). Information may be derived (in advance or in real time) based on elevation maps, allowing a relative height difference between two poles, e.g. situated at different locations on a hill, to be determined.

A camera may be used for the optical sensor 18. Where a camera is used, it is possible to determine an absolute 3D positioning of the luminaire 12 (i.e. an absolute degree of tilt) so long as the (3D) positions of the surrounding luminaires 30, 31 are known. This is since, as described above, the amount of shift of the maxima 50a, 50b within the field of view 42 can be correlated with the actual movement of the sensor 18 (and hence of the luminaire 12). The positions of the neighbouring light sources can be used as variables in the calculation determining this correlation. A simplification might be to assume that the surrounding light sources 30, 31 are positioned at the same height as the luminaire 12 in question.

In accordance with a further variation, a connected system of tilt detection devices may be implemented. In particular, for the example of FIG. 2, tilt detection devices coupled to each of the three light sources 12, 30, 31 may be communicatively linked, either directly or e.g. via a central server. They may be linked via a suitable communication network, where this may be via wired or wireless network connection such as e.g. a cellular network connection (or other, unrestricted bandwidth network).

This may enable more accurate tilt detection; in particular the capacity to correlate the sensor readings of all three luminaires to enable tilt of one device to be distinguished from tilt of the others. Were, for instance, luminaire 31 to tilt rightwards while luminaire 12 remained upright, this would register as movement of the light source out of the field of view 42 of luminaire 12 and could lead errantly to a determination of tilt of luminaire 12 rather than luminaire 31. By contrast, with a connected system, data from sensors of all of the luminaires may be compared and correlated, so that it can be pinpointed which luminaire is the one which has tilted. For instance, the direction of travel of maxima within the field of view of the sensor 18 at each luminaire could be compared and used to identify which luminaire is the one which has become tilted.

Connection of the luminaires may be via any suitable communication channel, including a wired or wireless network connection, an internet connection, or a mobile (cellular) network connection for instance.

Such a connected system may be implemented in accordance with any tilt detection device embodiment described in this disclosure or defined in the claims, and is not limited for instance to tilt detection devices according to the example of FIG. 2. In all examples that follow, the described tilt detection devices may advantageously be linked via a suitable communication network to enable sharing of sensor data and thereby more accurate and robust analysis of tilt detection.

Various embodiments of a tilt detection device adapted to utilise a moving luminous source will now be described, with reference to FIGS. 4-8.

Figure 4:
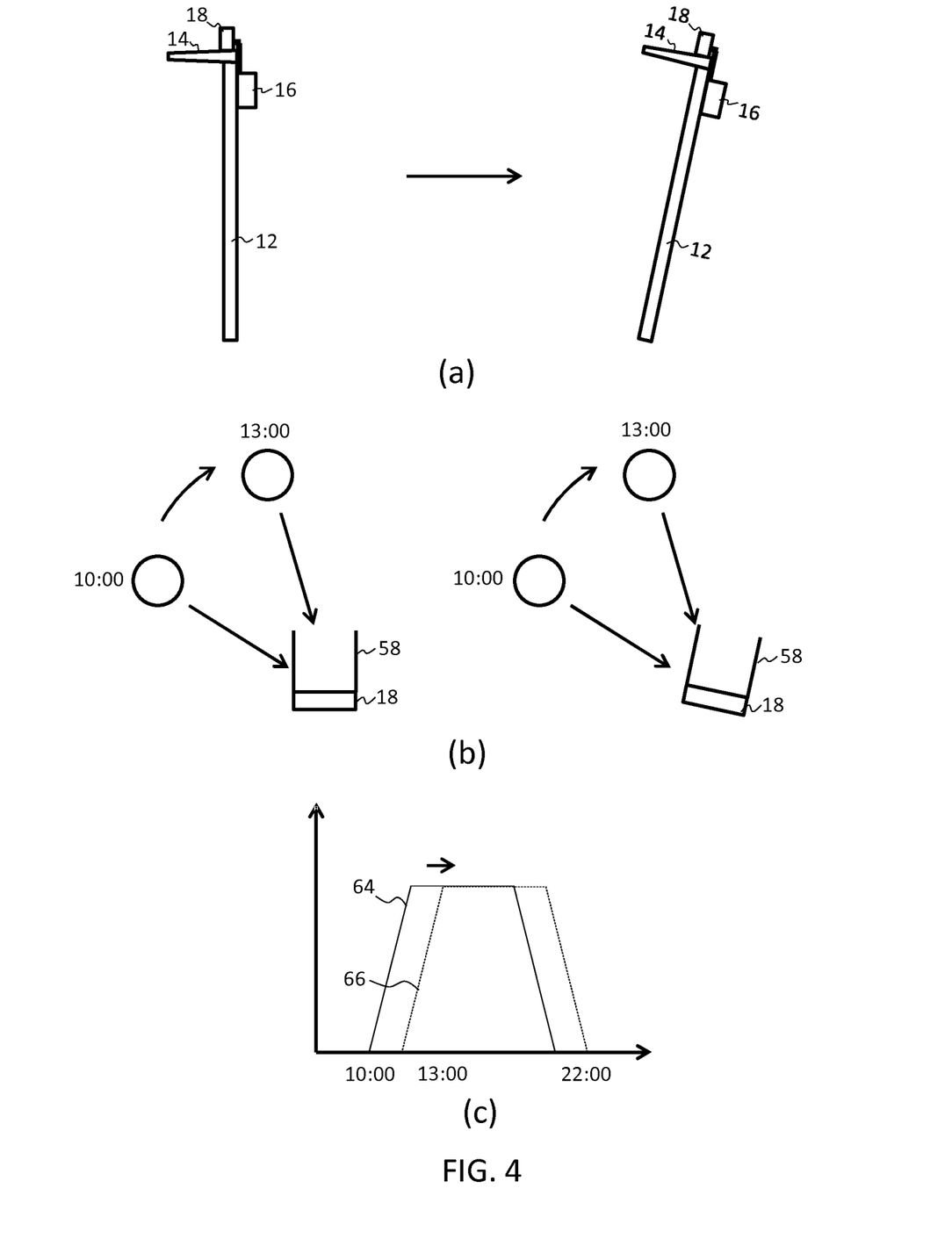
FIG. 4 schematically illustrates operation of a further tilt detection device in accordance with one or more embodiments.

FIG. 4 illustrates an example luminaire 12 having a tilt detection device comprising an optical sensor 18 and a controller 16. The device is adapted to detect tilt of the luminaire based on monitoring of an optical signal received from the sun.

FIG. 4(a) shows the luminaire 12 in an upright state (left) and a tilted state (right) and FIG. 4(b) shows the corresponding tilt states of the optical sensor 18 and their positioning relative to optical inputs received from the sun at different times of day. For this example, the tilt of the luminaire 12 is assumed to be in the same direction as the apparent motion of the sun across the sky, e.g. the tilt is in the east-west direction.

As shown in FIG. 4(b), the optical sensor in this example comprises a light modulation element in the form of a periphery boundary wall 58 extending around the perimeter of an input area of the optical sensor 18. The boundary wall may be approximately axially symmetric (e.g. circularly symmetric about a 'vertical' central axis extending through a central point of the sensor). However, this is not essential. The optical sensor in this case may have a field of view but need not have; the optical sensor is required only to record a total luminous flux or incident intensity across a sensing area.

The boundary wall 58 acts to cast a shadow upon the optical sensor 18 of varying size and extent depending upon the angle of the sun relative to the sensor. The boundary wall effectively means that light can only enter the sensor after a certain time of day, when the sun has risen to sufficient angle to overcome the height of the wall. The particular times at which light is first able to enter the sensor and at which light ceases to enter the sensor will change in dependence upon the tilt of the sensor and the boundary wall.

This is illustrated in FIG. 4(b) which shows the sensor 18 relative to the sun at different positions corresponding to a time of 10:00 in the morning and 13:00 in the afternoon. For the luminaire 12 (and sensor) in an upright position (left), light from the sun at 10:00 impinges upon the boundary wall 58 and is blocked from entering the sensor. However, by 13:00, the angle of the sun is such that light is now fully entering the sensor. This contrasts with the sensor for the luminaire in a tilted state (right), wherein, due to the tilt, at 13:00, the angle is such that light is only just beginning to fully enter the sensor 18.

These temporal changes are observable in the resulting variation of sensed light intensity at the sensor 18 over time. This is illustrated in FIG. 4(*c*). This shows the respective function of light intensity (y-axis) over time (x-axis) measured by the optical sensor 18 in each of the upright state (trace 64) and the tilted state (trace 66). As shown, each of the intensity-time functions 64, 66 have the same general shape, but are temporally translated with respect to one another. For the sensor in the upright state, the intensity-time function 64 increases from zero intensity at 10:00 to a peak intensity at approximately 11:30, before declining back to zero intensity at approximately 20:30. By contrast, for the sensor in a tilted state, the increase from zero intensity only begins at approximately 11:30 (1 hr30 later), reaching a peak intensity at around 13:00 before declining back to zero intensity by 22:00. Hence, the pattern of intensity variation is shifted backwards temporally by approximately 1 hr30.

In accordance with this embodiment therefore, the controller 16 of the tilt detection device may detect tilting of the luminaire 12 by identifying a temporal translation in the measured function of intensity over time at the sensor 18. Depending upon the size of the temporal translation, the degree of tilt can be determined: the greater the temporal shift, the greater the degree of tilt.

The above embodiment enables detection of tilt in cases where the tilting of the luminaire 12 and sensor 18 is in the same direction as the movement of the sun (or other stimulus source) relative to the sensor.

Figure 5:
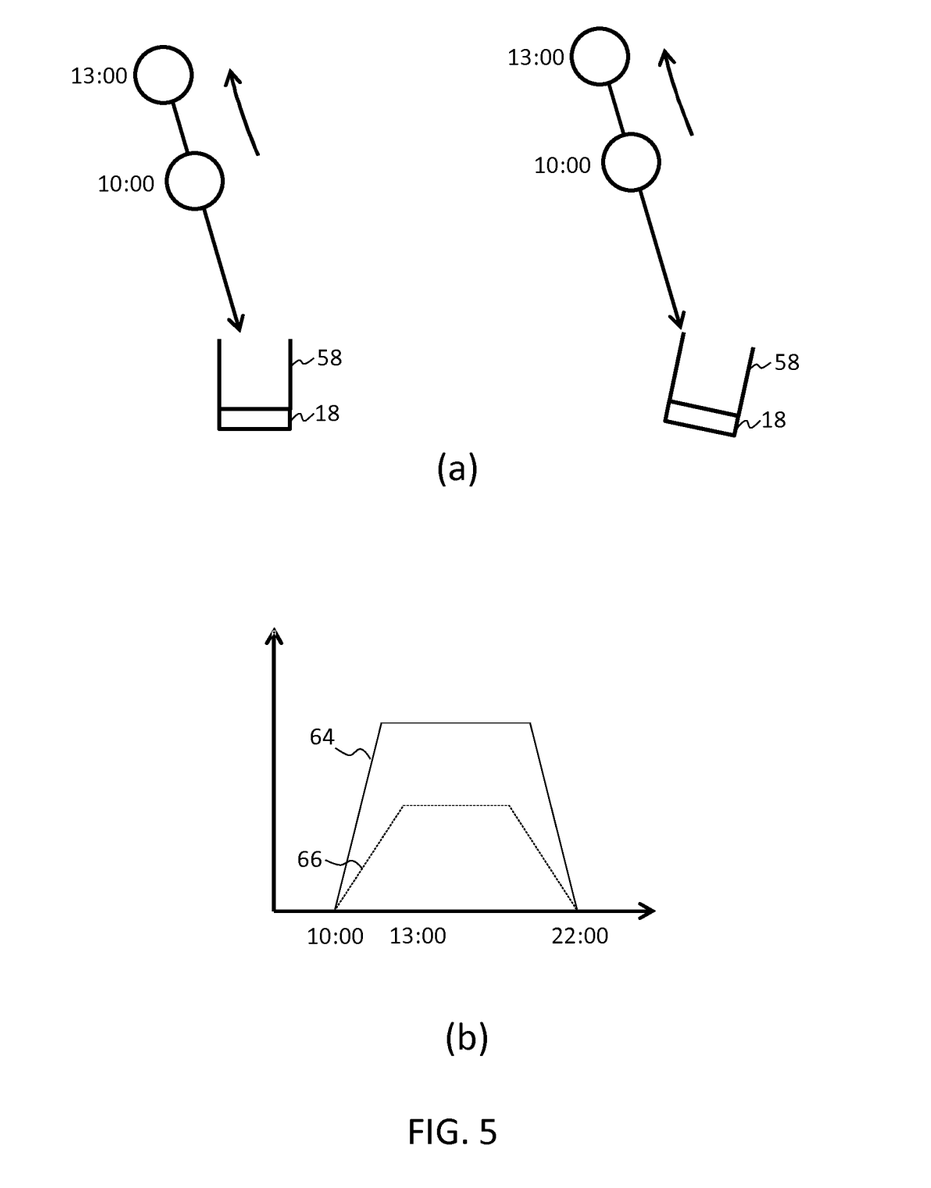
FIG. 5 schematically illustrates operation of a further tilt detection device in accordance with one or more embodiments.

Additionally or alternatively, tilt of the luminaire 12 and sensor 18 in a direction perpendicular to the movement of the sun or other stimulus source can be detected by detecting a different change in the measured intensity-time distribution at the sensor. An example is illustrated in FIG. 5 which shows the same example sensor 18 as that of FIG. 4 (having perimeter wall 58), in two different states of tilt and the configuration of those states relative to the sun in different positions in the sky as it moves along an arc approximately perpendicular in direction to the tilting of the sensor 18. The tilt is for example in the north-south direction.

In contrast to the example of FIG. 4, in this case, the effect of the (now perpendicular) tilting is not a temporal translation in the measured intensity-time function, but rather a reduction in the measured peak intensity at the sensor 18. This is illustrated in FIG. 5(*b*) which shows the measured intensity at the sensor (y-axis) as a function of time (x-axis) for each of the upright sensor (trace 64) and the tilted sensor (trace 66). As shown, the general pattern or shape of the intensity-time function is approximately the same for both tilting states, but simply has a different maximum (or peak) intensity value.

The reason for this can be seen schematically from FIG. 5(*a*). For the present example, in which the tilting is in a direction perpendicular to the movement of the sun across the sky, the tilting of the perimeter wall 58 leads to a partial blocking of light entering across all hours of the day and all positions of the sun. This leads to a persistent reduction in the amount of light reaching the sensor.

Tilting of the sensor 18 and the luminaire 14 in a direction perpendicular to the movement of the sun may hence be detected by the controller 16 in accordance with the above embodiment by monitoring the measured intensity-time function at the sensor and identifying a reduction in the peak intensity of the function.

This embodiment may advantageously be combined with the embodiment of FIG. 4 to detect tilting in a direction having components both parallel and perpendicular to the movement of the sun by identifying both a temporal translation in the measured intensity-time function and an increase or decrease in the peak intensity of the intensity-time function compared with a reference intensity-time function (representative of an upright state).

Although in the above example, only the peak intensity of the function is shown as changing, with the 'start' and 'end' points (i.e. points of minimum intensity) remaining the same, this is by way of simple illustration only. In real-word scenarios, it may be that the minimum intensity points may well shift slightly, due to a degree of angular dependency which applies in all directions. However, this shift may in examples be compensated by the controller 16, for instance through simple geometric calculation and offsetting.

In accordance with one or more examples, the sensor 18 may be provided with a light modulating element in the form of a peripheral wall which is axially asymmetric (i.e. rotationally asymmetric about a central axis). Such an embodiment may advantageously be implemented to enable sensing of axial rotation of the object to which it is mounted (in addition to sensing of tilting of the object).

Figure 6:
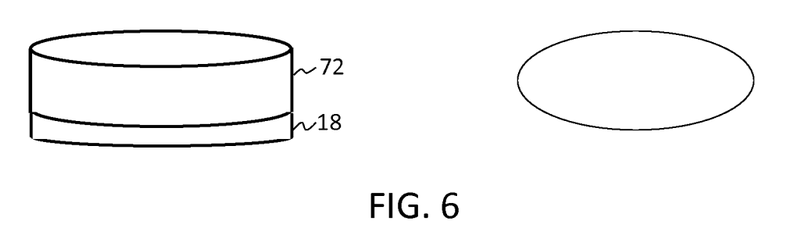
FIG. 6 schematically depicts a sensor of a tilt detection device adapted to detect axial rotation in accordance with one or more embodiments.

FIG. 6 illustrates an example of such an embodiment. An optical sensor 18 is provided comprising a perimeter wall 72 having an elliptical or oval-shape outer perimeter or cross-section. The aperture across the top of the sensor is oval shaped or elliptical. The left side image shows a perspective view of the sensor and wall, while the right side image shows a top-down view of the sensor and wall. Depending upon the axial rotation of the sensor 18 and the boundary wall, the times at which light is first and last able to enter the sensor before becoming blocked by the boundary wall 72 differs.

Figure 7:
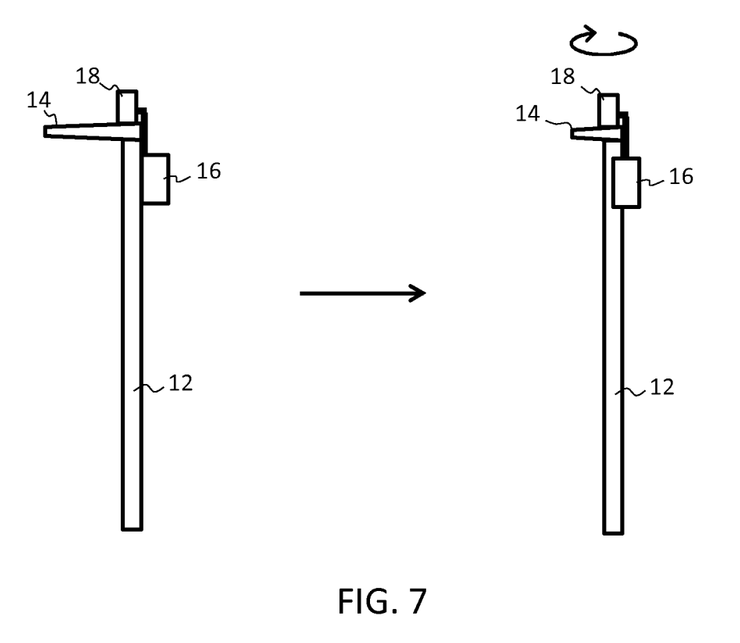
FIGS. 7 and 8 schematically depict operation of the tilt detection device of FIG. 6.
Figure 8:
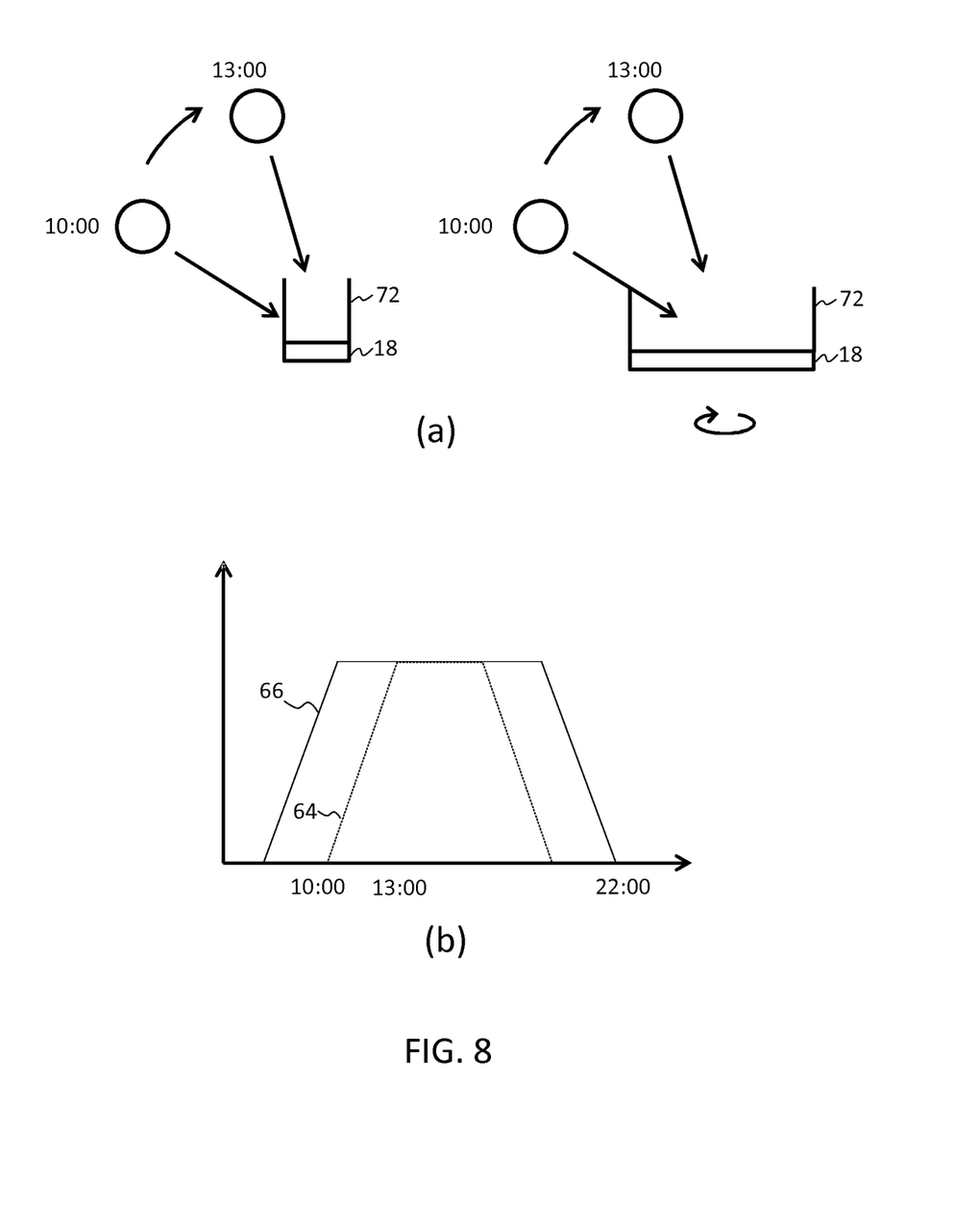

This is illustrated in FIGS. 7 and 8. FIG. 7 illustrates a luminaire 12 having an optical sensor 18 in accordance with the example of FIG. 6 mounted above the level of a light source 14 of the luminaire. The luminaire is shown in two different states of axial rotation.

The luminaire and sensor on the right of FIG. 7 is assumed to be axially rotated by an amount 90° relative to the luminaire and sensor on the left.

FIG. 8(*a*) shows a sectional view of the optical sensor 18 (having elliptical boundary wall 72) in these two states of axial rotation, and the positions of the sun at different times of day relative to the sensor 18 in these two states. As shown, for the sensor in the first state of axial rotation (left), at a time of 10:00, light is blocked by the boundary wall 72, such that shadow is cast on the sensor and no light falls incident. By contrast, for the sensor being rotated by 90° (right), the additional diametric 'length' of the sensor parallel to the incoming light when in this state of rotation means that light is able to enter the sensor from a relatively lower elevation angle. Hence, at 10:00, light is able to enter to the sensor. Similarly, light is able to continue to enter the sensor in the 90° rotated state (right) until later in the evening compared with the sensor in the 0° rotated state.

This effect is observable in the resultant measured intensity-time function at the sensor, as shown in FIG. 8(*b*). Trace 64 shows the measured intensity (y axis) at the sensor as function of time (x-axis) for the sensor 18 in the 0° axial rotation state (FIG. 8(*a*), left). Trace 66 shows the measured intensity as a function of time for the sensor 18 in the 90° axial rotation state (FIG. 8(*a*), right). The intensity-time function for the axially rotated sensor differs from the non-rotated sensor in having an increased width in the time dimension, between a start point of minimum intensity (zero in this case) and a later end point of the same minimum intensity.

The above embodiment may be advantageously combined with either of the previous two embodiments to enable detection of tilt of an object either parallel or perpendicular with the direction of a moving luminous source and simultaneously detect axial rotation of the object.

The particular described embodiments of FIGS. 4-8 each make use a light modulating element in the form of a boundary wall 58, 72 extending around a perimeter of the sensor 18 to provide a light modulation effect or pattern onto the sensor which varies depending upon the angle at which light is directed at the sensor and also the angle of tilt of the sensor. As a result, different tilt states of the sensor may be detected by identifying changes in the measured variation of intensity over time at the sensor for a certain regular time period.

A boundary wall is one example of a suitable light modulation element for providing this functionality. A further example may include a light modulating roof element, provided either in addition to or instead of the boundary wall element 58, 72 of the previous examples.

Figure 9:
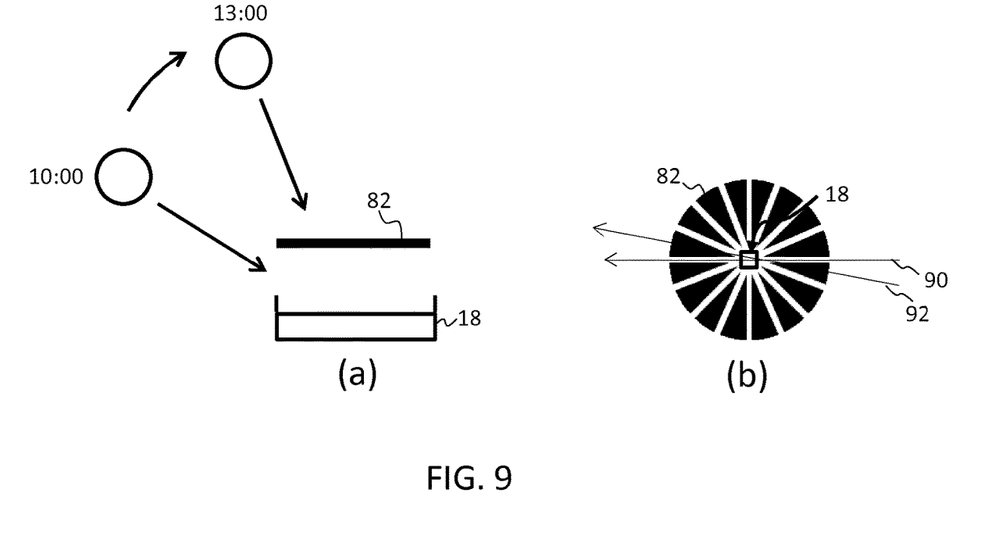
FIG. 9 schematically depicts a sensor of a further tilt detection device, utilising a light modulating mask in accordance with one or more embodiments.

An example is illustrated in FIG. 9(a), which shows an optical sensor 18 having a light modulating roof element 82 and only a minimal boundary wall. The roof element 82 serves a similar function in respect of a moving light source such as the sun or the moon as the boundary wall 58, 72 of previous examples. As the sun (for example) moves through different positions in the sky, the roof element impinges upon the light directed toward the sensor in different ways. As shown in FIG. 9(a), at 10:00, for instance, light is able to enter the sensor through the vertical space between the roof element 82 and the sensor 18. However, by 13:00, the sun has risen to an elevation such that all light is blocked from entering the sensor by the roof element. It can be readily recognised that should the sensor be tilted for instance parallel to the movement of the sun, the times at which light may enter the sensor and at which light is blocked by the roof element will differ.

The tilting is therefore detectable in changes in the measured intensity as a function of time at the sensor 18. In particular, as in previous examples, the measured intensity-time function will be temporally translated in the case of tilting in a direction parallel to the movement of the sun, and will have a reduced or increased peak intensity in the case of tilting in a direction perpendicular to the movement of the sun.

A variation on the light modulating roof element of FIG. 9(a) is shown in FIG. 9(b). This variant roof element may have a generally circular or elliptical shape, or a hemispherical or hemi-elliptical shape, and is formed of a plurality of generally sector-shape wedge-elements, each separated from neighbours by a narrow gap. A central annulus of the roof element is open, providing a direct window to the sensor 18. This particular shape renders the sensor more sensitive to relative pole axial rotation. In particular, due to the shape of the element, depending upon the rotation of the sensor (and hence of the luminaire 12), the sensor 18 is either exposed to light from the sun for almost the entirety of a day, or exposed to light for only a small portion of the day. This will result in either an intensity-time function having a relatively wide width in the time dimension between points of minimum intensity, or a very narrow width between such points.

This is illustrated schematically in FIG. 9(a). In the case that the sun passes along an arc parallel with path 90 for instance, the sensor 18 below the roof element is exposed to a maximum of intensity from the sun for the entirety of daylight hours, regardless of the elevation of the sun relative to the sensor 18. Even when the sun is low in the sky, the gap between the relevant wedge shapes allows light to penetrate through into the sensor. By contrast, in the case that the sun passes along an arc parallel with path 92, light from the sun is substantially blocked from the sensor for almost all of the day, except for a period during the middle of the day, when the sun in high the sky and light can penetrate through the central annulus of the roof element. During periods of lower elevation of the sun, the wedge shape interposed in the sun light path blocks most of the light from entering.

Provision of a generally hemi-spherical or hemi-elliptical shape in particular may render the arrangement less sensitive to changes in elevation of the light source, limiting the sensitivity simply to axial rotation (since the added 'height' means that the variation of light entry to the sensor, as e.g. the sun rises, is reduced.

Hence, accurate determination of axial rotation may be determined by comparing the sensed intensity at the sensor as a function of time. A change from a wide intensity-time function in the time domain to a narrow one pay provide an indication that a small axial rotation has occurred. A further change following this, back to a wide intensity time function, may indicate further axial rotation. By making the sectorial wedges suitably narrow, very small axial rotations can be detected.

In accordance with a further example, a semi-transparent sensor cap may be provided in place of the roof element described above. The semi-transparency would add an extra element of modification to the shadow cast on the sensor. The advantage of such an example is that light can still be received at the sensor while the attenuation pattern can be used as a signature to detect angular variations in the position of the light source relative to the sensor.

According to a further variation, a roof element or other light modulation element may be provided structured in a way such as to form a free-form lens, for example based on principles described in: Martin Bawart, Stefan Bernet, and Monika Ritsch-Marte, "*Programmable freeform optical elements,*" Opt. Express 25, 4898-4906 (2017).

Such an element acts to bundle light to multiple places on the sensor. The optical operation is similar to that of a lens, but differs in that light is not focused to a single point or line, but rather to a focal 'image' or pattern, wherein light is bundled to a plurality of locations. The effect is a strong angular dependency, wherein the sensor is only exposed to light when the light source is at specific locations relative to the sensor or specific angular displacements. The amount of light received at the sensor will vary (potentially in a continuous manner) in dependence upon the position of the light source, varying (at the extremes) from full exposure in certain positions to zero exposure at others.

Changes in tilt state or axial rotation may then be sensed by changes in the received light pattern or intensity distribution of light across a field of view of the sensor 18. Furthermore, the particular angular dependencies of the sensor may be mapped so as to enable precise quantitative determination by the controller 16 of the amount by which a sensor (and luminaire) has tilted or rotated. A further advantage is that light according to this variation is not wasted by blocking or deflection, so the sensor may be more sensitive for instance to low light conditions.

Although in embodiments described above, by way of example, the sun is utilised as an optical stimulus source having a known positional relationship with the luminaire, in further examples, different moving optical sources may be used. For example, the moon may be used in accordance with one or more embodiments. Use of the moon rather than the sun may be convenient for locations with few sunny days and/or during winter seasons, when sunlight hours are more reduced, or sunlight is less visible. In all cases, the moon may be used instead of utilisation of the sun or in complementarity to utilisation of the sun.

In further examples, car headlights might be utilised as moving luminous sources, since movement is likely to be highly correlated with the direction of the road in question, and the speed limit of the road means that the speed of movement may be assumed to be roughly constant. Exact position of vehicles on the road need not be known; relative degree of tilt or rotation may be determined simply by comparison over time of the detected function of intensity over time at the sensor.

In embodiments described above, use is made of a single optical sensor 18 adapted to provide a single measurement of light intensity or flux at the sensor. In accordance with further examples, multiple optical sensors may be used. Using multiple sensors, the detection area may be segmented or broken up, either discretely or according to an overlapping scheme.

A ratio of the sensor signals for different segmented regions may be used to determine a spatial distribution in measured light intensity across the detection area. This may enable more precise or subtle tilt or rotation detection. In particular, where only a single sensor cell is used for instance (as may be case for example in the examples of FIGS. 4-9), only a single overall average light intensity across the sensor can be detected. In this case, it may be difficult to distinguish between, on the one hand, relative movement of the light source leading to changes in the size of the shadow cast by the sensor wall 58, 72, and, on the other, simply a global dimming of the light source caused e.g. by temporary cloud cover in the case of the sun as the light source. By using data from multiple sensors and determining a contrast between their readings, global changes in light intensity (affecting therefore all sensors) can be detected and discounted from determinations of changes in position of the light source. By looking at contrast ratios between multiple sensors on a continuing basis throughout a given day, global variations can be normalized, and a more accurate ongoing determination of movement of the light source (via identified total shadow area cast by the wall 58, 72) achieved.

In the case of provision of multiple sensors, these need not be aligned in a single plane, but may be placed in any 3D configuration. So long as the particular positional relationship between the sensors is known, their respective signals may be used to determine a 2D or 3D distribution of intensity being received at the sensor. Changes in this spatial distribution over time may then be used to indicate changes in the tilt or rotation state of the sensor and the object to which it is mounted.

In accordance with one or more embodiments, an optical sensor 18 may be provided in the form of a photodiode, coupled with a light modulating element in the form of pin-hole roof element, i.e. a mask covering the sensor comprising a pin-hole opening. In these examples, the lateral effect of the photodiode may be used to detect changes in the angular position of the sun or other moving light source relative to the sensor. As this relative angle changes, the position of the small area of the sensor which is exposed by the sun through the pin-hole varies, and this is detected in variation in the measured current. Changes in how this small area of illumination moves as a function of time from one day to the next may provide an indication of changes in a tilt state of the sensor and the object to which it is mounted.

In accordance with one or more examples, a camera may be used as an optical sensor 18 to track the movement of a moving light source over time. A camera is essentially a planar matrix of discrete light sensors, and having a lens which determines a field of view for the camera. Determination of a position of light sources relative to the camera may be performed using standard signal and computer vision algorithms. By monitoring changes in the detected pattern of light source movement over time, possible changes in tilt or rotation state may be identified.

Although in the particular examples and embodiments described above, optical sources in the form of light sources are proposed, in further examples, any optical source may be utilised, emitting radiation of any frequency or combination of frequencies of the electromagnetic spectrum, including e.g. infrared light.

Embodiments disclosed above have been described primarily in relation to use with a pole lamp or street light. However, the inventive concept is applicable more broadly to the sensing of tilt of any object. The inventive concept is most effective in detecting tilt for generally pole-like objects or bodies, or bodies which are otherwise elongated and mounted by their base. This is because for these bodies, any detected movement of the sensor relative to surroundings is indicative of tilt of the object.

Embodiments above have been described primarily in relation to use of luminous sources and optical sensors. However, in accordance with further embodiments, other electromagnetic wave sensors may additionally or alternatively be used. In any of the above described examples and embodiments, the optical sensor and source(s) may be replaced by a sensor and sources of a different kind of electromagnetic wave stimulus without any substantive change to the structure or operation of the device. These may include by way of non-limiting example infrared sensors or ultraviolet sensors.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A luminaire comprising a device for detecting tilting of the luminaire, the device comprising:
    a sensor for sensing electromagnetic wave stimuli, the sensor mounted to the luminaire and arranged in use to receive an electromagnetic wave stimulus from one or more remotely located stimulus sources, the stimulus sources being external to the luminaire and having either a stable posotion or a stable pattern of positions over time with respect to fixed points on earth; and
    a controller, adapted to:
        detect changes in one or more intensity characteristics of the received stimulus compared with a reference stimulus, the reference stimulus being representative of a received stimulus by the sensor when the luminaire to which the sensor is mounted is in a known state of tilt, and the changes being indicative of changes in a positional relationship between the one or more stimulus sources and the sensor, and
        determine, based on said detected changes in the one or more intensity characteristics and/or the indicated changes in the positional relationship, a change in a state of tilting of the luminaire.

2. The luminaire as claimed in claim 1, wherein the sensor has a field of view, and wherein the one or more intensity characteristics include locations in the field of view of one or more intensity maxima associated with one or more respective stimulus sources of the plurality of stimulus sources, and the change in the state of tilting being detected by detecting changes in said locations compared to a set of reference locations.

3. The luminaire as claimed in claim 1, wherein the sensor gas a field of view, and wherein the one or more intensity characteristics include a detected total number of intensity maxima within said field of view.

4. The luminaire as claimed in claim 1, wherein at least one of the plurality of stimulus sources has a dynamic positional relationship with respect to the sensor, and wherein the one or more intensity characteristics include the variation in measured electromagnetic intensity at the sensor as a function of time over a defined time period, and the tilting being detected by detecting changes in said exhibited function of intensity over the defined time period compared to a reference function of intensity over the defined time period.

5. The luminaire as claimed in claim 4, wherein
    said change in the function of intensity over time includes a translation of the function in the time dimension; and/or
    the change in the function of intensity over time comprises a change in a peak intensity of the function.

6. The luminaire as claimed in claim 4, wherein the change in the function of intensity over time includes an increase in a width of the intensity function in the time dimension, between a start point of minimum intensity and a later end point of the same minimum intensity.

7. The luminaire as claimed in claim 4, wherein the at least one of the plurality of stimulus sources include the sun and/or the moon.

8. The luminaire as claimed in claim 1 wherein the sensor comprises one or more photodiodes.

9. The luminaire as claimed in claim 1, wherein the sensor comprises a camera.

10. The luminaire as claimed in claim 1, wherein the sensor is an optical sensor and comprises a light modulation element arranged to interact with light entering the sensor so as to provide a light modulation pattern onto the sensor, wherein a configuration of the pattern is dependent upon the angle of the incoming light.

11. The luminaire as claimed in claim 10, wherein:
    the light modulation element comprises a boundary wall extending around a perimeter of the sensor, and wherein the light modulation pattern comprises for one or more sets of angles of incoming light an area of continuous shadow across the sensor; and/or
    the light modulation element comprises a mask extending over the sensor, and wherein the light modulation element comprises for one or more sets of angles one or more localised areas of relative high light intensity surrounded by an encompassing region of shadow.

12. The luminaire as claimed in claim 10, wherein the light modulation element is adapted to attenuate light entering the sensor in accordance with a defined attenuation pattern.

13. A base-mountable pole comprising a luminaire as claimed in claim 1 mounted to the pole and adapted to detect tilt of the pole.

14. A tilt detection system comprising:
    a plurality of luminaires as claimed in claim 1 comprising a device for detecting tilt of the luminaire, the devices being directly or indirectly linked via a communication network, and wherein each device is adapted to communicate via said communication network one or more data outputs derived from readings from a respective sensor, and optionally wherein
    at least a first of said plurality of devices is adapted to utilize one or more of the data outputs communicated by a second of the plurality of devices as a reference stimulus for detecting changes in a stimulus received at the sensor of the first device.

15. A method of detecting tilting of a luminaire, the method comprising:
    receiving at a sensor for sensing electromagnetic wave stimuli a stimulus from one or more remotely located stimulus sources, the sensor being mounted to the luminaire and the stimulus sources being external to the luminaire and having either a stable position or a stable pattern of positions over time with respect to fixed points on earth;
    detecting changes in one or more intensity characteristics of the received stimulus compared with a reference stimulus, the reference stimulus being represtative of a received stimulus by the sensor when the luminaire to which the sensor is mounted is in a known state of tilt, and the changes being indicative of changes in a positional relationship between the one or more stimulus sources and the sensor, and
    based on said detected changes in the one or more intensity characteristics and/or the indicated changes in the positional relationship, determining a change in a state of tilting of the luminaire.

* * * * *